United States Patent [19]

Seghal et al.

[11] Patent Number: 5,211,538
[45] Date of Patent: May 18, 1993

[54] METHOD FOR FOLDING HELICOPTER MAIN ROTOR BLADES

[75] Inventors: Ajay Seghal, Bedford; Bryan W. Marshall, Arlington, both of Tex.

[73] Assignee: Bell Helicopter Textron Inc., Ft. Worth, Tex.

[21] Appl. No.: 800,578

[22] Filed: Nov. 27, 1991

[51] Int. Cl.⁵ .......................................... B63H 11/00
[52] U.S. Cl. ........................................ 416/1; 416/142; 416/143; 244/17.11
[58] Field of Search .............. 244/17.11, 49; 416/1, 416/142, 143, 121, 244 R

[56] References Cited

U.S. PATENT DOCUMENTS

| | | | |
|---|---|---|---|
| 2,110,443 | 3/1938 | Larsen et al. | 416/143 X |
| 2,405,777 | 8/1946 | Buivid | 416/143 |
| 2,538,082 | 1/1951 | Buivid | 416/142 X |
| 2,549,886 | 4/1951 | Buivid | 244/17.11 |
| 3,112,088 | 11/1963 | Speechley | 416/143 X |
| 3,133,715 | 5/1964 | Grunfelder | 244/17.11 |
| 3,343,610 | 9/1967 | Ferris et al. | 416/142 |
| 3,356,155 | 12/1967 | Ferris | 170/160.12 |
| 3,484,175 | 12/1969 | Vacca et al. | 416/143 |
| 3,625,631 | 12/1971 | Covington et al. | 416/1 |
| 3,743,441 | 7/1973 | Ferris | 416/143 |
| 3,749,515 | 7/1973 | Covington et al. | 416/143 |
| 4,252,504 | 2/1981 | Covington et al. | 416/143 |
| 4,301,982 | 11/1981 | Tiemann | 244/49 X |
| 4,354,234 | 10/1982 | MacLennan et al. | 364/424 |
| 4,376,979 | 3/1983 | Fowler et al. | 364/424 |
| 4,623,300 | 11/1986 | Ruzicka | 416/143 |
| 4,712,978 | 12/1987 | Tiemann | 416/1 |
| 5,031,858 | 7/1991 | Schellhase et al. | 244/700 |

Primary Examiner—Edward K. Look
Assistant Examiner—Todd Mattingly
Attorney, Agent, or Firm—James E. Bradley

[57] ABSTRACT

A method of folding the main rotor blades of a helicopter for storage in which blade supports are removably attached to the nose and tail of the fuselage of the helicopter. A first and second main rotor blades then are aligned with the longitudinal axis running from the forward blade support to the aft blade support. The first and second blades are placed upon, and restrained from rotation in, the blade supports. Then the first and second blades are permitted to fold about the rotor assembly of the helicopter by releasing a locking member of each blade. The first and second blades are folded by rotating the main rotor assembly while restraining from rotation the first and second blades in the forward and aft blades supports, respectively. After the rotor assembly is rotated through approximately 90 degrees, a third and fourth of the rotor blades are aligned with the longitudinal axis running through the forward and aft blade supports and the first and second blades are fully folded. Finally, the third and fourth main rotor blades are placed upon the forward and aft blade supports.

8 Claims, 3 Drawing Sheets ated on the nose 13 and tail 15 sections
of the fuselage by pinned brackets 19.

METHOD FOR FOLDING HELICOPTER MAIN ROTOR BLADES

BACKGROUND OF THE INVENTION

1. Field Of The Invention

This invention relates to the lifting blades of helicopters, more specifically to methods for folding the blades of the main rotor for purposes of storage.

2. Summary Of The Prior Art

In the prior art, the main rotor blades of helicopters are constructed to permit folding of the blade about the rotor to decrease the space required for storing the aircraft. In addition to conservation of storage space, the folded blades generally are secured to prevent damage caused by the blades striking each other in high winds or other conditions that cause movement of the blades.

Many of these prior art systems are comprised of motors, gears, linkages and control systems that automatically fold the main rotor blades of the helicopter. U.S. Pat. Nos. 4,376,979, 4,354,234, 3,749,515, 3,743,441, 3,484,175, and 3,356,155 all show motorized, fully automated blade folding systems. Such systems add a great deal of weight to the helicopter, and are difficult to maintain and inspect.

Other prior art blade folding systems are completely manual in operation. U.S. Pat. No. 4,712,978 shows one such method and apparatus. U.S. Pat. Nos. 4,623,300 and 4,252,504 show main rotor blade supports and locking member systems, respectively, adapted for use in manual blade folding systems. In these prior art rotor blade folding systems, workers are required to move the blades manually from the ground using a crutch pole or other device. When the locking member is released, the blade and rotor structure loses a great deal of rigidity. If a person moving the blades manually were to drop the blade with the locking member released, serious damage to the hinge pin, the yoke, or the blade itself is quite possible. To avoid such damage, in one prior art technique supporting braces are secured to the rotor assembly during the folding process. This procedure is time-consuming and requires heavy and cumbersome ground support equipment.

SUMMARY OF THE INVENTION

The object of the present invention is to provide a simplified method for folding the main rotor blades of a helicopter for storage that employs a minimum number of additional parts.

This object is accomplished by attaching blade support apparatuses to the nose and tail sections of the helicopter fuselage. Two of the four blades of the main rotor then are rotated into alignment with a longitudinal axis running through the blade supports and the main rotor blades are then placed upon and secured to the blade supports by use of restraining devices.

Next, locking members are released so that the blades supported by the blade supports may fold about the rotor assembly. The rotor assembly then is rotated such that the third and fourth blades, not previously engaged by the blade supports, are aligned with the longitudinal axis running through the blade supports and then are placed upon the blade supports.

DETAILED DESCRIPTION

Figure 1:
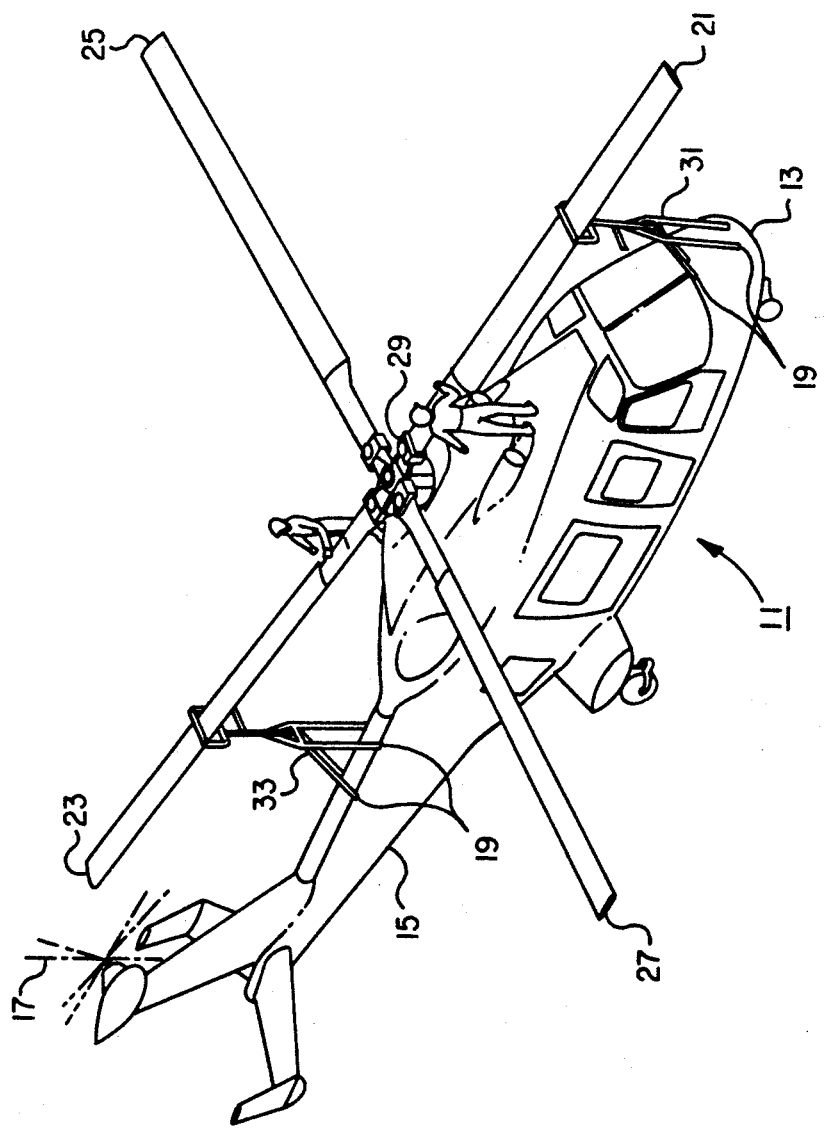
FIG. 1 is a perspective view of a helicopter with blade supports attached to the nose and tail sections of the fuselage and the main rotor blades in an unfolded position, illustrating a step of the folding method in accordance with the present invention.

Referring to FIG. 1, a typical helicopter 11 is shown. The helicopter has a fuselage, or body, having a nose section 13 and a tail section 15. At the rear and uppermost section of the tail 15 is the tail rotor 17, used for steering the helicopter. Four rotor blades 21, 23, 25, and 27 are mounted on the main rotor assembly 29 of the helicopter. The main rotor blades provide lift while the helicopter is in flight. Blade supports 31 and 33 are removably mounted on the nose 13 and tail 15 sections of the fuselage by pinned brackets 19.

Figure 5:
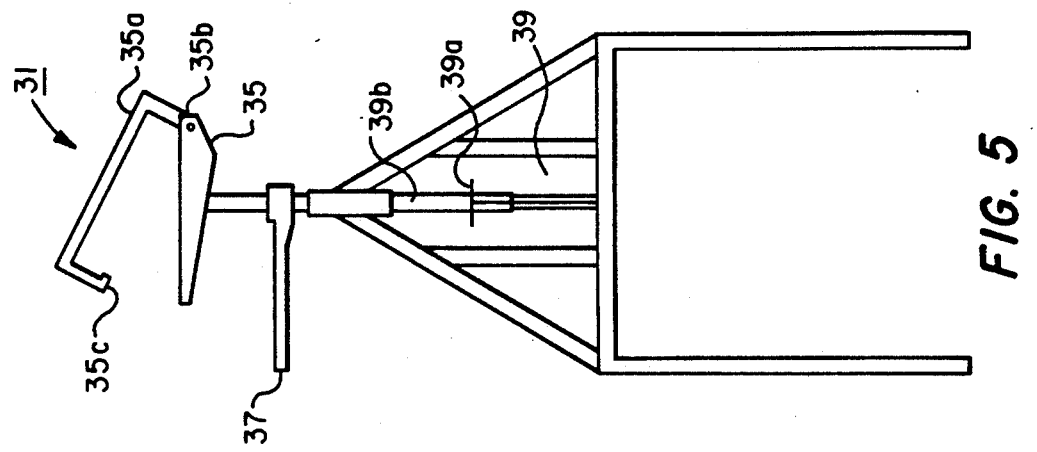
FIG. 5 is a detailed front elevational view of a forward blade support as in FIGS. 1-3 of a type intended for use in the method of the present invention.

Referring now to FIG. 5, a forward blade support 31 intended for use in the method of the present invention is shown. The blade support 31 is provided with a main blade cradle 35 that has a restraining device 35a attached thereto by a hinge 35b and closed about the rotor blade with latch device 35c. The blade support 31 is also provided with a lifting device 39 comprised of a lever 39a and a shaft 39b to which the main blade cradle 35 is attached. The blade support 31 is further provided with a second blade cradle 37. The blade cradles 35 and 37 are lined with a relatively low-friction material to prevent damage to the rotor blades placed thereon. While a forward blade support is shown, it should be understood that the aft blade support 33 is substantially similar in configuration to that shown in FIG. 5.

Figure 4:
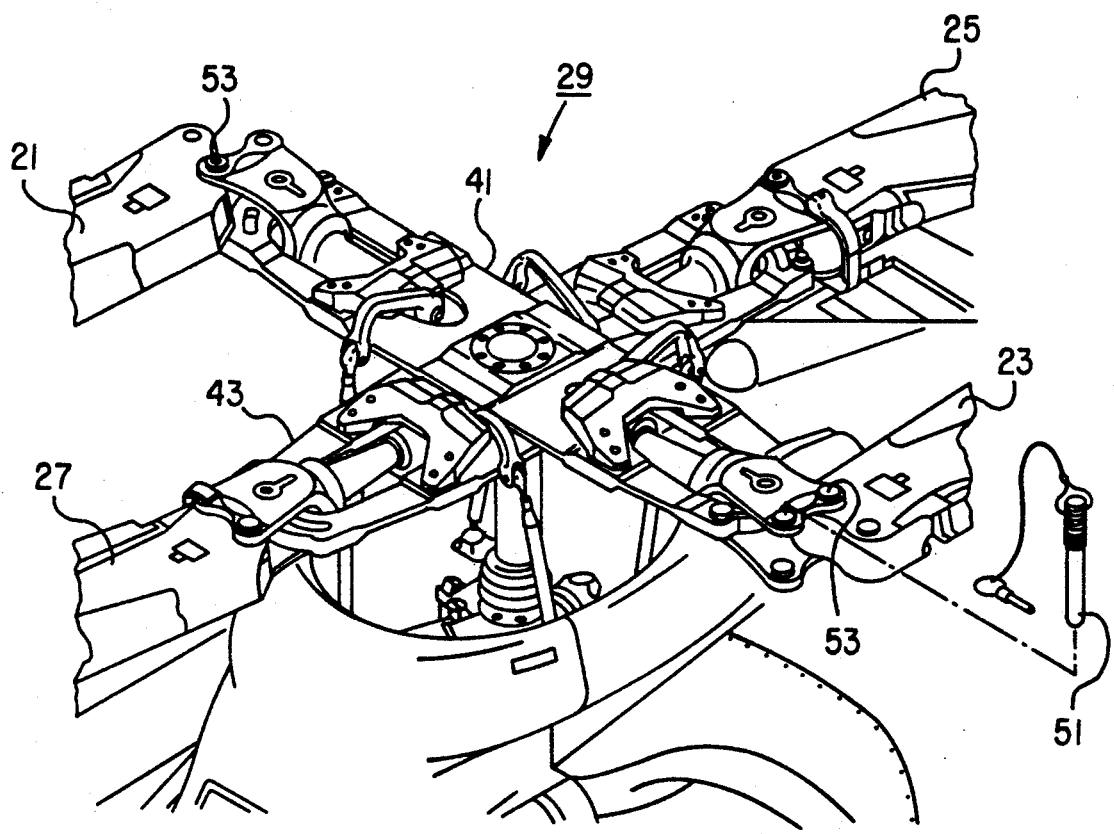
FIG. 4 is a perspective view of the rotor assembly of the helicopter shown in FIGS. 1-3 showing the quick-release bolt removed from the yoke and the blades in fully folded position.

Referring now to FIG. 4, a detailed view of the main rotor assembly 29 is shown. Each of the four main rotor blades 21, 23, 25, and 27 is mounted on an upper yoke 41 or lower yoke 43 by means of a quick-release bolt 51 and a hinge bolt 53. The quick-release bolt 51 is removable, and when removed permits each blade to rotate about its hinge bolt 53, thus the quick-release bolt 51 serves as a locking member. Upper yoke 41 is located above and perpendicular to yoke 43. Rotor blades 21 and 23 are attached to upper yoke 41.

Referring back to FIG. 1, the steps of the method of the present invention will be discussed. First, the blade supports 31 and 33 are removably attached to the nose 13 and tail 15 sections of the fuselage of the helicopter 11.

The main rotor assembly 29 and the four blades 21, 23, 25, and 27 then are rotated such that first blade 21 and second blade 23 are in substantially parallel alignment with longitudinal axis running through the forward and aft blade supports 31 and 33. The forward blade 21 then is placed upon the main blade cradle 35 (FIG. 5) of the forward blade support 31. The restraining device 35a (FIG. 5) then is closed about the rotor blade 21, thus restraining the movement of the blade vertically and laterally with respect to the blade support 31. Likewise, the aft blade 23 is placed upon the aft blade support 33 and is restrained similarly.

Next, the forward and aft rotor blades 21 and 23 are lifted in their respective blade cradles 35 by actuating the lifting device 39 of each of the respective blade supports 31 and 33. Actuating the lever 39a of the lifting device 39 causes the shaft 39b, and blade cradle 35 attached thereto, to move upward a few inches. The blades 21 and 23 are lifted to relieve strain on the quick-release and hinge bolts 51 and 53 shown in FIG. 4 to facilitate the folding operation. Referring now to FIG. 4, the quick-release bolts 51 are removed from the yoke 41 of the rotor assembly 29 for the forward blade 21 and the aft blade 23. The forward and aft blades 21 and 23 are then free to rotate about their respective hinge pins 53, and therefore to fold about the rotor assembly 25.

Figure 2:
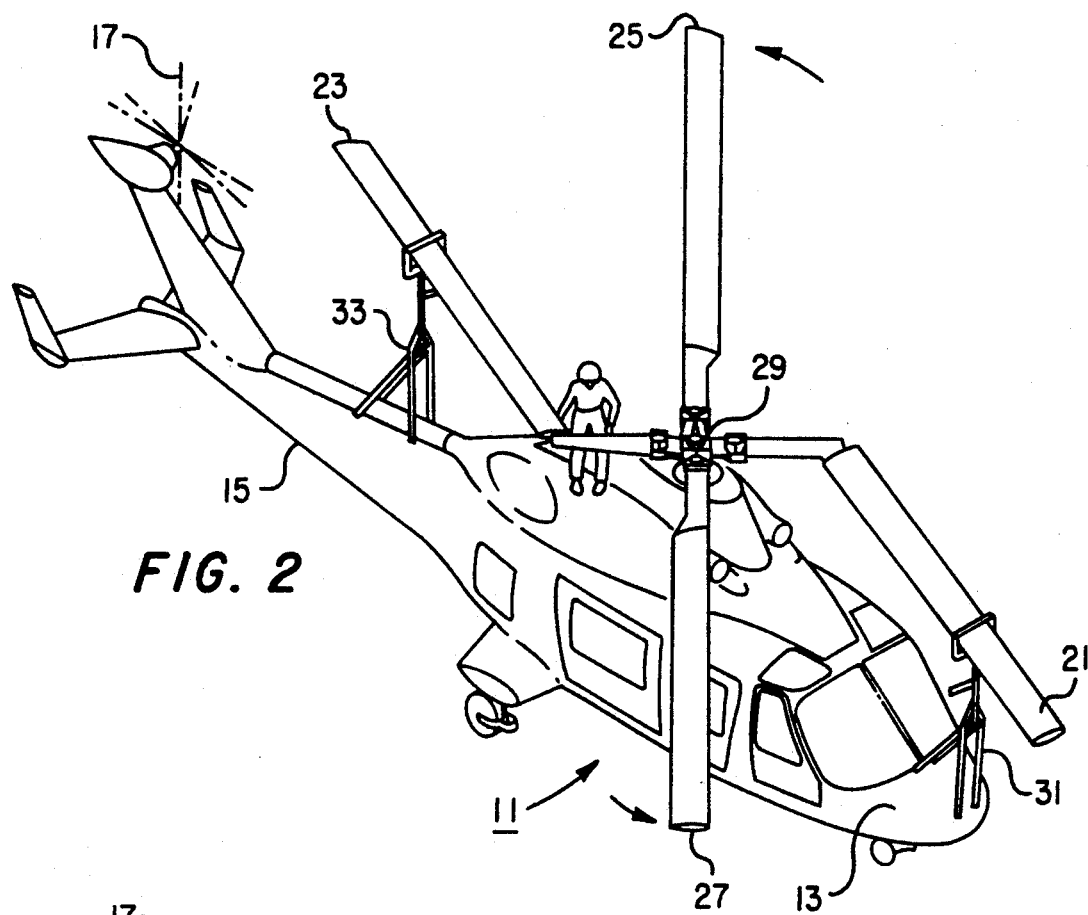
FIG. 2 is another perspective view of the helicopter of FIG. 1 showing the first and second blades with quick-release bolts removed and the blades in partially folded position.

Referring to FIG. 2, the main rotor assembly 29 then is rotated in its usual direction of rotation such that the forward and aft rotor blades 21 and 23 rotate about their hinge bolts 53 and thus fold with respect to the main rotor assembly 29. Because the rotor blades 21 and 23 remain fixed with respect to the rotor assembly 29, they turn fold around the rotor assembly 29. Because the forward and aft rotor blades 21 and 23 are restrained from rotation by the restraining devices 35a (FIG. 5) of their respective supports 31 and 33, the rotor blades 21 and 23 slide rearwardly and forwardly, respectively, as they fold about the rotor assembly 25. It will be appreciated by those familiar with the art that the rotation of the rotor assembly 29 may be accomplished either by having workers manually turn the rotor assembly 29, or by having workers turn the tail rotor 17.

Figure 3:
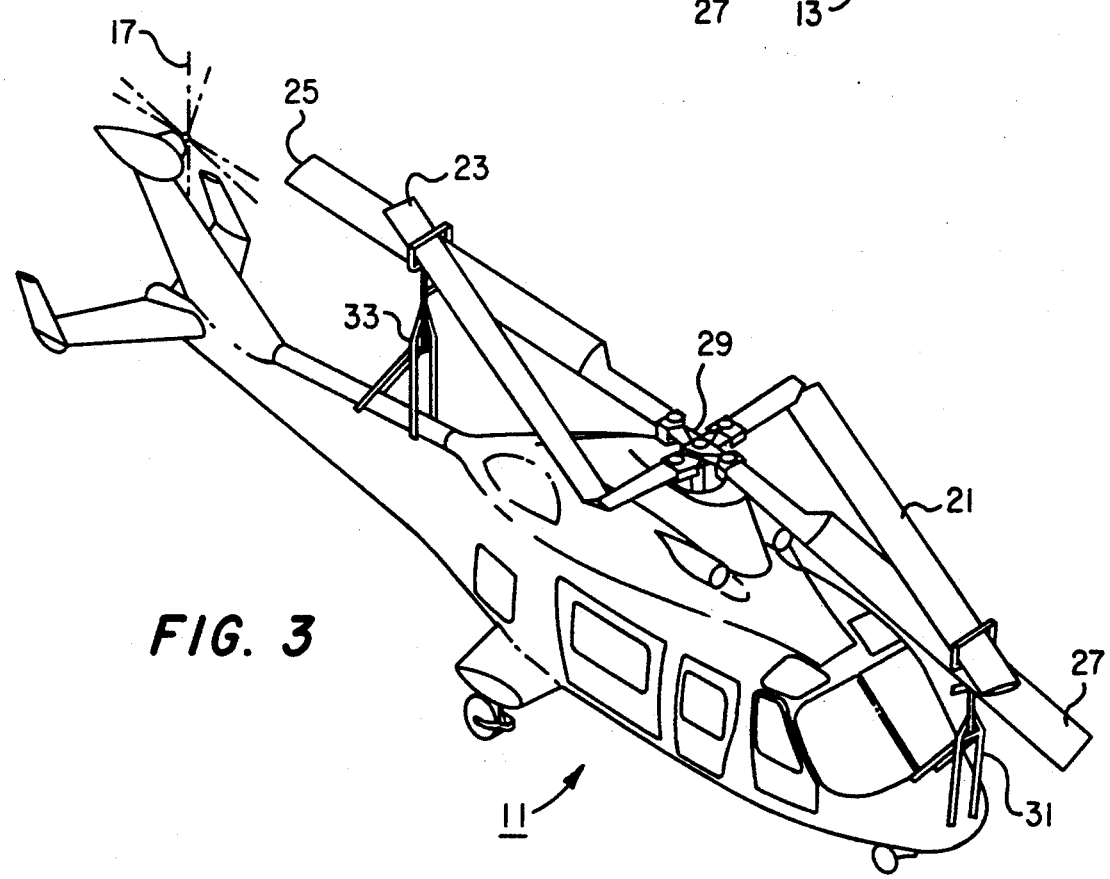
FIG. 3 is another perspective view of the helicopter of FIG. 1 showing the main rotor blades in the fully folded position with all four blades placed upon the blade supports.

FIG. 3 shows the helicopter 11 with the blades 21, 23, 25, and 27 in final folded position. After moving the rotor assembly 29 approximately 90 degrees from its original position, the folding rotor blades 21 and 23 are in their fully folded positions and remain restrained by the forward 31 and aft 33 blade supports. The non-folded blades 25 and 27 then are placed upon separate blade cradles 37 shown in FIG. 5, of the forward and aft blades supports 31 and 33.

It will be appreciated that the main rotor blades 21, 23, 25, and 27 may be unfolded simply by reversing the steps of the procedure. The third and fourth blades 25 and 27 are removed from their respective blade supports. Next, the rotor assembly 29 is rotated through approximately 90 degrees of rotation in the direction opposite that employed earlier. The first and second blades 21 and 23 are thus unfolded about the rotor assembly. When the rotation is complete, the first and second blades 21 and 23 are in their unfolded positions, and the quick-release bolts 51 may be replaced in the yoke 41 or 43. The restraining devices 35 of the forward and aft blade supports 31 and 33 are released, and the rotor blades 21 and 23 are lowered by reversing the operation of the lifting devices 37. Finally, the forward and aft blade supports 31 and 33 are removed from the fuselage of the helicopter 11.

One advantage of the method of the present invention is that it requires no permanent addition of parts to the helicopter, and thus is very simple and lightweight. The method of the present invention does not require that any machinery be added permanently to the helicopter, thus reducing weight, maintenance, inspection time, and the possibility of failure. Another advantage of the method of the present invention is that it is semi-automated and thus reduces the possibility of human error. In the present invention, the folding blades are supported before the quick release bolt is removed, preventing the possibility of blade damage from dropping in the unlocked position. Also, in the present invention the folded blades are held stationary by the blade support and the rotor is moved relative to the blades to accomplish folding, thus removing a large margin for human error. This method is much faster than prior art techniques that require securing drop-preventing braces to the rotor assembly during folding.

While the invention has been shown in its only one of its forms, it is not thus limited but is susceptible to various changes and modifications without departing from the scope of the invention.

We claim:

1. A method of folding the main rotor blades for storage of a helicopter of a type having a main rotor assembly with a yoke and first, second, third and fourth blades, each blade foldably attached to the yoke by a means including a locking member, the helicopter having a fuselage with a nose section located before the main rotor assembly and a tail section located aft of the main rotor assembly, the method comprising the steps of:
   removably attaching a forward blade support to the nose section of the fuselage;
   removably attaching an aft blade support to the tail section of the fuselage;
   rotating the main rotor assembly to a position in which the first and second blades are in substantially parallel alignment with a longitudinal axis running from the forward blade support to the aft blade support; then
   placing the first and second blades on the forward and aft blade supports, respectively; then
   releasing the locking members of the first and second blades to permit the yoke to rotate relative to the first and second blades; then
   rotating the main rotor assembly while restraining from rotation the first and second blades in the forward and aft blade supports, respectively, to a position in which the third and fourth blades are in substantially parallel alignment with a longitudinal axis running from the forward blade support to the aft blade support; and then
   placing the third and fourth blades on the forward and aft blade supports.

2. The method according to claim 1 further comprising the steps of lifting the first and second blades in the forward and aft blade supports, respectively, before releasing the locking members.

3. The method according to claim 1 wherein the step of placing the third and fourth blades on the forward and aft blade supports comprises placing the third and fourth blades on portions of the forward and aft blade supports that are separate from those portions upon which the first and second blades are placed.

4. The method according to claim 1 wherein the step of restraining the first and second blades from rotation in their respective blade supports comprises closing a restraining device around each of the first and second blades.

5. A method of folding blades for storage of a helicopter of a type having a main rotor assembly with a yoke and first, second, third and fourth blades, each blade foldably attached to the yoke by a means including a locking member, the helicopter having a fuselage with a nose section located before the main rotor assembly and a tail section located aft of the main rotor assembly the method comprising the steps of:

removably attaching a forward blade support to the nose section of the fuselage;

removably attaching an aft blade support to the tail section of the fuselage;

rotating the main rotor assembly to a position in which the first and second blades are in substantially parallel alignment with a line running from the forward blade support to the aft blade support; then placing the first and second blades on the forward and aft blade supports, respectively; then lifting the first and second blades in their blade supports; then releasing the locking members of the first and second blades to permit the yoke to rotate relative to the first and second blades; then rotating the main rotor assembly while restraining from rotation the first and second blades in the forward and aft blade supports, respectively, to a position in which the third and fourth blades are in substantially parallel alignment with a longitudinal axis running from the forward blade support to the aft blade support; and then placing the third and fourth blades on the forward and aft blade supports.

6. The method according to claim 5 wherein the step of placing the third and fourth blades on the forward and aft blade supports comprises placing the third and fourth blades on portions of the forward and aft blade supports that are separate from those portions upon which the first and second blades are placed.

7. The method according to claim 1 wherein the step of restraining from rotation the first and second blades in their respective blade supports comprises closing a restraining device around each of the first and second blades.

8. A method of folding the main rotor blades for storage of a helicopter of a type having a main rotor assembly with a yoke and first, second, third and fourth blades, each blade foldably attached to the yoke by a means including a locking member, the helicopter having a fuselage with a nose section located before the main rotor assembly and a tail section located aft of the main rotor assembly, the method comprising the steps of:

removably attaching a forward blade support to the nose section of the fuselage;

removably attaching an aft blade support to the tail section of the fuselage;

rotating the main rotor assembly such that the first and second blades are in substantially parallel alignment with a longitudinal axis running from the forward blade support to the aft blade support; then placing the first and second blades on the forward and aft blade supports, respectively; then restraining from rotation the first and second blades in their respective blade supports by closing a restraining device around the first and second blades allowing the first and second blades to slide rearwardly and forwardly in the blade supports; then lifting the first and second blades in the blade supports; then releasing the locking members of the first and second blades to permit the yoke to rotate relative to the first and second blades; then rotating the main rotor assembly while restraining the first and second blades in the forward and rearward blades supports, respectively allowing the first and second blades to slide rearwardly and forwardly in the blade supports; and then placing the third and fourth blades on a separate platform of each of the forward and aft blade supports.

* * * * *